United States Patent
Na

(10) Patent No.: US 11,029,944 B2
(45) Date of Patent: Jun. 8, 2021

(54) DEVICE AND METHOD OF MANAGING DATA OF DISTRIBUTED ANTENNA SYSTEM

(71) Applicant: SOLiD, INC., Seongnam-si (KR)

(72) Inventor: Bongcheol Na, Anyang-si (KR)

(73) Assignee: SOLiD, INC., Seongnam (KR)

( * ) Notice: Subject to any disclaimer, the term of this patent is extended or adjusted under 35 U.S.C. 154(b) by 0 days.

(21) Appl. No.: 15/862,101

(22) Filed: Jan. 4, 2018

(65) Prior Publication Data

US 2018/0189053 A1    Jul. 5, 2018

(30) Foreign Application Priority Data

Jan. 5, 2017    (KR) .................... 10-2017-0002035

(51) Int. Cl.

| | |
|---|---|
| *G06F 8/658* | (2018.01) |
| *H04L 12/771* | (2013.01) |
| *G06F 8/61* | (2018.01) |
| *H04L 29/08* | (2006.01) |
| *G06F 8/71* | (2018.01) |

(Continued)

(52) U.S. Cl.
CPC ............... *G06F 8/658* (2018.02); *G06F 8/61* (2013.01); *G06F 8/71* (2013.01); *H04L 41/08* (2013.01); *H04L 41/082* (2013.01); *H04L 45/563* (2013.01); *H04L 67/34* (2013.01); *H04B 7/022* (2013.01)

(58) Field of Classification Search
CPC ..... H04W 16/26; H04W 88/08; H04W 16/32; H04W 4/026; G06F 8/61; G06F 8/65; G06F 8/658; G06F 8/71; H04L 67/34; H04L 41/08; H04L 41/082; H04L 45/563; H04B 7/022

See application file for complete search history.

(56) References Cited

U.S. PATENT DOCUMENTS

| | | | |
|---|---|---|---|
| 9,307,067 B2 * | 4/2016 | Debates | ............ H04M 1/72525 |
| 9,317,280 B2 * | 4/2016 | Li | ............................. G06F 8/61 |

(Continued)

OTHER PUBLICATIONS

Silvie Schmidt et al.; Secure Firmware Update Over the Air in the Internet of Things Focusing on Flexibility and Feasibility; researchgate; 4 pages; retrieved on Jan. 26, 2021 (Year: 2016).*

(Continued)

*Primary Examiner* — S. Sough
*Assistant Examiner* — Cuong V Luu
(74) *Attorney, Agent, or Firm* — Sughrue Mion, PLLC

(57) ABSTRACT

The inventive concept relate to a device and method of managing data of a distributed antenna system. According to an embodiment of the inventive concept, a data management device of a distributed antenna system includes an unpackaging unit, when a package file which is generated by packaging firmware files of a plurality of devices constituting a distributed antenna system is input, configured to unpackage the package file; a control unit configured to determine a device requiring firmware update by comparing version information of the package file with version information of a firmware file of each of the devices included in the unpackaged package file; and a transmission unit configured to transmit a latest version of a firmware file to a device corresponding to a top node of the device requiring firmware update according to a result of the determination.

13 Claims, 5 Drawing Sheets

(51) Int. Cl.
*H04L 12/24* (2006.01)
*H04B 7/022* (2017.01)

(56) References Cited

U.S. PATENT DOCUMENTS

| | | | | |
|---|---|---|---|---|
| 2003/0217193 | A1* | 11/2003 | Thurston | G06F 8/65 719/321 |
| 2011/0191764 | A1* | 8/2011 | Piorecki | G06F 8/65 717/172 |
| 2015/0052512 | A1* | 2/2015 | Kostadinov | G06F 8/65 717/173 |
| 2015/0220317 | A1* | 8/2015 | Li | G06F 8/61 717/169 |
| 2016/0036956 | A1* | 2/2016 | Debates | H04M 1/72525 455/419 |
| 2016/0092204 | A1* | 3/2016 | Katkere | G06F 9/44526 717/170 |
| 2016/0283221 | A1* | 9/2016 | Kochar | G06F 9/45558 |
| 2016/0357546 | A1* | 12/2016 | Chang | G06F 21/57 |

OTHER PUBLICATIONS

Byung-Chul Choi et al.; Secure Firmware Validation and Update for Consumer Devices in Home Networking; IEEE; pp. 39-44; retrieved on Jan. 26, 2021 (Year: 2016).*

* cited by examiner

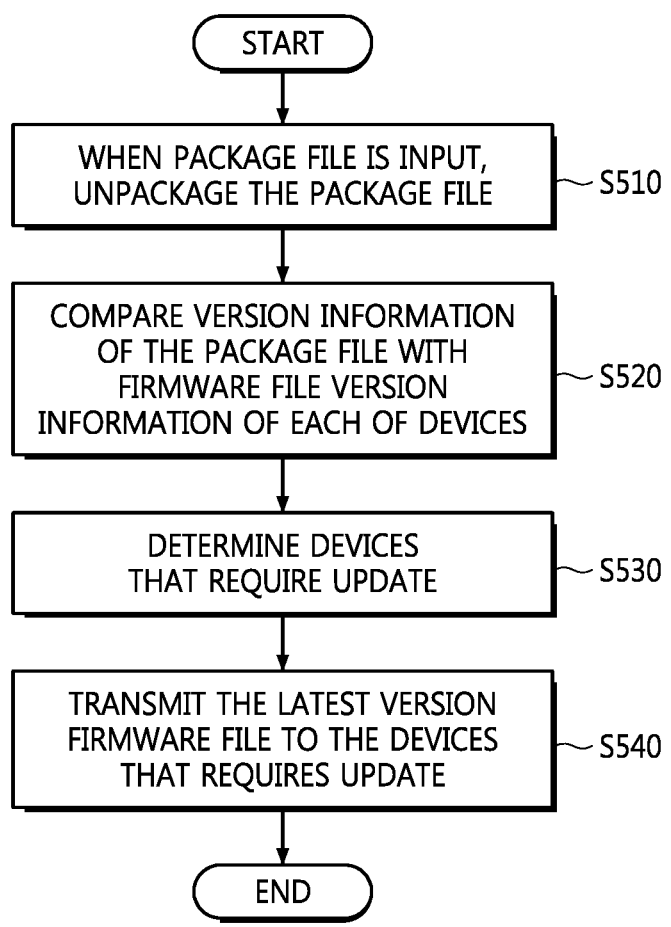

DEVICE AND METHOD OF MANAGING DATA OF DISTRIBUTED ANTENNA SYSTEM

BACKGROUND

1. Field

One or more embodiments relate to a device and method of managing data of a distributed antenna system, and more particularly, to a data management device to efficiently update firmware of devices constituting a distributed antenna system, and a method of the same.

2. Description of the Related Art

Generally, with the development of mobile communication, users' usage patterns and demands are also diversified so that users want to communicate with each other without restriction of time and space. However, an output of radio waves is limited in a base station, and the base station is installed by each zone or area. A shadow area exists due to a location of the base station or a topography. In order to solve this problem, a distributed antenna system capable of obtaining a predetermined effect at an inexpensive price is provided. The distributed antenna system is installed in an area where radio waves are not received or where radio waves are weak, such as inside buildings, underground buildings, subways, tunnels, and apartment complexes in a residential area.

The distributed antenna system has been utilized in coverage expansion of a base station to extend services to a shadow area where signals of the base station are difficult to reach due to landmarks between base stations constituting a wireless communication service network.

In the distributed antenna system, a Base Transceiver Station (BTS) Interface Unit (BIU) connected to a base station and a remote unit are connected to each other by an optical cable. The BIU converts RF signals of various bands received from the base station into an optical signal to transmit the same to the remote unit, and converts the optical signal received from the remote unit into an RF signal to transmit the same to the base station. The remote unit includes a Remote Optical Unit (ROU) and a Remote Digital unit (RDU). The remote unit converts the optical signal received from the BIU into a digital signal and an RF signal, combines RF signals of various bands into one signal by using a multiplexer, and transmits the signal to a mobile terminal through one antenna.

Meanwhile, each device (e.g., BIU, ROU, RDU, etc.) of the distributed antenna system needs periodic firmware update. Conventionally, each of devices included in the distributed antenna system has been updated. However, as the number of the devices included in the distributed antenna system increases due to an increase in a service bandwidth, it is difficult to individually update the devices. Therefore, there is a need for an alternative to efficiently update firmware of each device of the distributed antenna system.

SUMMARY

One or more embodiments include a data management device of a distributed antenna system capable of efficiently updating firmware of devices constituting the distributed antenna system.

According to an example embodiment, a data management device of a distributed antenna system, the data management device comprising: an unpackaging unit, when a package file which is generated by packaging firmware files of a plurality of devices constituting a distributed antenna system is input, configured to unpackage the package file; a control unit configured to determine a device requiring firmware update by comparing version information of the package file with version information of a firmware file of each of the devices included in the unpackaged package file; and a transmission unit configured to transmit a latest version of a firmware file to a device corresponding to a top node of the device requiring firmware update according to a result of the determination of the control unit.

In an embodiment, the control unit is configured to determine that a device having a version of a firmware file lower than a version of the package file is the device requiring firmware update, based on the version information of the package file and the version information of the firmware file of each of the devices.

In an embodiment, the package file comprises a latest version of a firmware file designated by a user together with the firmware files of the devices constituting the distributed antenna system, and the version information of the package file is version information of the latest version of the firmware file.

In an embodiment, the plurality of devices comprise at least one of a BTS Interface Unit (BIU), a Main Drive BTS Unit (MDBU), a Remote Optical Unit (ROU), and a Remote Digital Unit (RDU).

In an embodiment, the BIU is configured to retain identification information about the existing ROU connected to a lower node of the BIU and transmit a latest firmware file to a new ROU when the new ROU is connected to the lower node of the BIU.

In an embodiment, the new ROU is configured to transmit its identification information to the BIU when the new ROU is connected to the BIU, wherein the identification information includes an address, an ID, and manufacturer information of the new ROU.

In an embodiment, the BIU, when the identification information is input from the new ROU, is configured to compare the retained identification information with the input identification information to determine a type of the new ROU connected to the BIU, and transmit a latest firmware file corresponding to the determined type of the new ROU to the address of the new ROU.

In an embodiment, the ROU is configured to retain identification information about the existing RDU connected to a lower node of the ROU and transmit a latest firmware file to a new RDU when the new RDU is connected to the lower node of the ROU.

In an embodiment, the new RDU is configured to transmit its identification information to the ROU when the new RDU is connected to the ROU, wherein the identification information includes an address, an ID, and manufacturer information of the new RDU.

In an embodiment, the ROU, when the identification information is input from the new RDU, is configured to compare the retained identification information with the input identification information to determine a type of the new RDU connected to the ROU, and transmit a latest firmware file corresponding to the determined type of the new RDU to the address of the new RDU.

In an embodiment, the transmission unit is configured to transmit the firmware file of the latest version together with information on the device requiring the firmware update through a device corresponding to the top node in sequence.

In an embodiment, the data management device further comprising: a storage unit configured to store a result of the update by the latest version of the firmware file received from the control unit after the latest version of the firmware file is transmitted to the device requiring the firmware update.

In an embodiment, the control unit is configured to transmit the update result including at least one of identification information of the device to which a firmware file needs to be transmitted, a firmware file name, firmware file version information, an update time, and information on whether update is successful received from the device requiring firmware update.

According to an example embodiment, a method of managing data of a distributed antenna system, the method comprising: unpackaging the package file when a package file, which is generated by packaging firmware files of a plurality of devices constituting a distributed antenna system, is input; comparing version information of the package file with version information of the firmware file of each of the devices included in the unpackaged package file; determining a device requiring firmware update according to a result of the comparing; and transmitting a latest version of a firmware file to a device corresponding to a top node of the device requiring firmware update, according to a result of the determining.

In an embodiment, the determining of the device requiring firmware update comprises determining that a device having a version of a firmware file lower than a version of the package file is the device requiring firmware update, based on the version information of the package file and the version information of the firmware file of each of the devices.

BRIEF DESCRIPTION OF THE DRAWINGS

These and/or other aspects will become apparent and more readily appreciated from the following description of the embodiments, taken in conjunction with the accompanying drawings in which:

FIG. 5 is a flowchart of an operation of a data management device according to an embodiment of the inventive concept.

DETAILED DESCRIPTION

Figure 1:
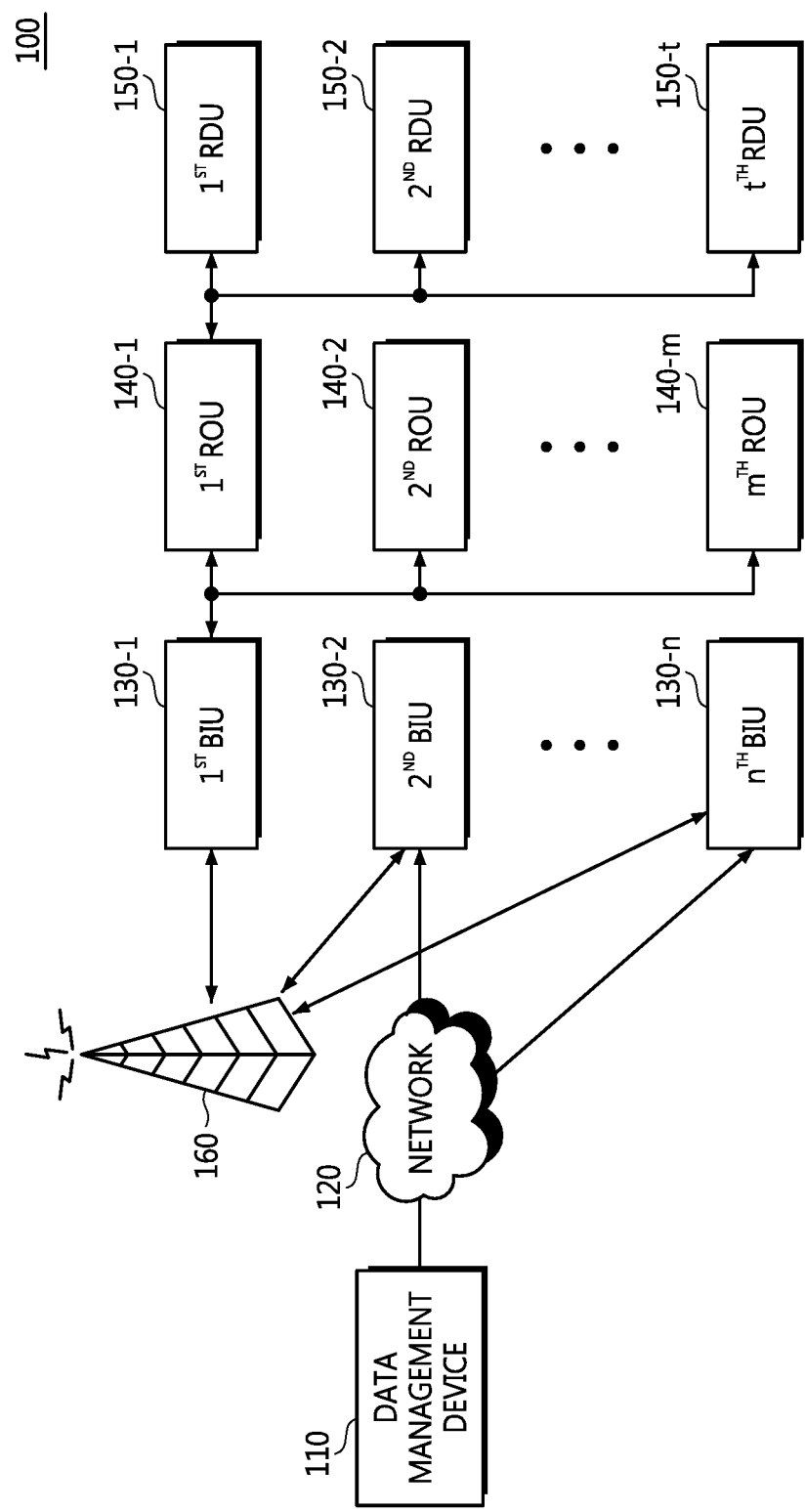
FIG. 1 is a configuration diagram of a distributed antenna system according to an embodiment of the inventive concept.

The inventive concept may be variously modified and have various example embodiments, so that specific example embodiments will be illustrated in the drawings and described in the detailed description. However, this does not limit the inventive concept to specific example embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, example embodiments of the inventive concept will be described in detail.

FIG. 1 is a configuration diagram of a distributed antenna system 100 according to an embodiment of the inventive concept.

Referring to FIG. 1, the distributed antenna system 100 according to an embodiment may include a data management device 110 connected to the distributed antenna system 100 through a network 120 to manage data of the distributed antenna system 100, a base station 160, a plurality of BTS Interface Units BIUs 130-1 to 130-$n$ ($n$ is a natural number), a plurality of Remote Optical Units (ROUs) 140-1 to 140-$m$ ($m$ is a natural number), and a plurality of Remote Digital Units (RDUs) 150-1 to 150-$t$ ($t$ is a natural number).

FIG. 1 shows that the plurality of ROUs 140-1 to 140-$m$ are connected to only the first BIU 130-1 and the plurality of RDUs 150-1 to 150-$t$ are connected to only the first ROU 140-1, for convenience of description. However, the plurality of ROUs may also be connected to the second to $n^{th}$ BIUs 130-2 to 130-$n$, and the plurality of RDUs 150-1 to 150-$t$ may also be connected to the second to $m^{th}$ ROUs 140-2 to 140-$m$, respectively.

Each BIU, for example, the first BIU 130-1 is connected to the plurality of ROUs 140-1 to 140-$m$. The first BIU 130-1 may convert an RF signal received from the base station 160 on a downlink into an optical signal and transmit the converted optical signal to each ROU (for example, the first ROU 140-1), and may convert an optical signal received from each ROU (e.g., the first ROU 140-1) on an uplink to the RF signal and transmit the RF signal to the base station 160. Furthermore, each BIU, for example, the first BIU 130-1 may convert a transmission signal from the base station 160 into an optical signal and separate the converted optical signal for each frequency band.

The plurality of ROUs 140-1 to 140-m may be installed in each building or each floor of each building to amplify and output signals received from the plurality of BIUs 130-1 to 130-n. Each ROU, for example, the first ROU 140-1 may convert an optical signal received from the first BIU 130-1 into a digital signal and output the digital signal to the first RDU 150-1. The first ROU 140-1 and the plurality of RDUs 150-1 to 150-t are illustrated as separate devices in FIG. 1 for convenience of description. However, the first ROU 140-1 may include the plurality of RDUs 150-1 to 150-t.

The plurality of RDUs 150-1 to 150-t may be installed in each of the plurality of ROUs 140-1 to 140-m, for example, the first ROU 140-1 to convert a digital signal received from the first ROU into an analog signal, and to amplify and output the analog signal. Each RDU, for example, the first RDU 150-1 may convert the digital signal received from the first ROU 140-1 into an analog signal, and may amplify and output the analog signal. Furthermore, the plurality of RDUs 150-1 to 150-t may receive an uplink signal received from a terminal (not shown), convert the uplink signal into a digital signal, and transmit the digital signal to each of the plurality of ROUs 140-1 to 140-m, for example, the first ROU 140-1. The data management device 110 may be connected to devices (e.g., the plurality of BIUs 130-1 to 130-n) constituting the distributed antenna system 100 through the network 120.

The data management device 110 may manage data such as software and firmware installed in each device of the distributed antenna system 100 to which the data management device 110 is connected. Furthermore, the data management device 110 may update a version of firmware installed in each device of the distributed antenna system 100. A detailed structure and operation of the data management device 110 for updating the version of the firmware installed in each device of the distributed antenna system 100 will be described in more detail with reference to FIGS. 2 to 4.

Figure 2:
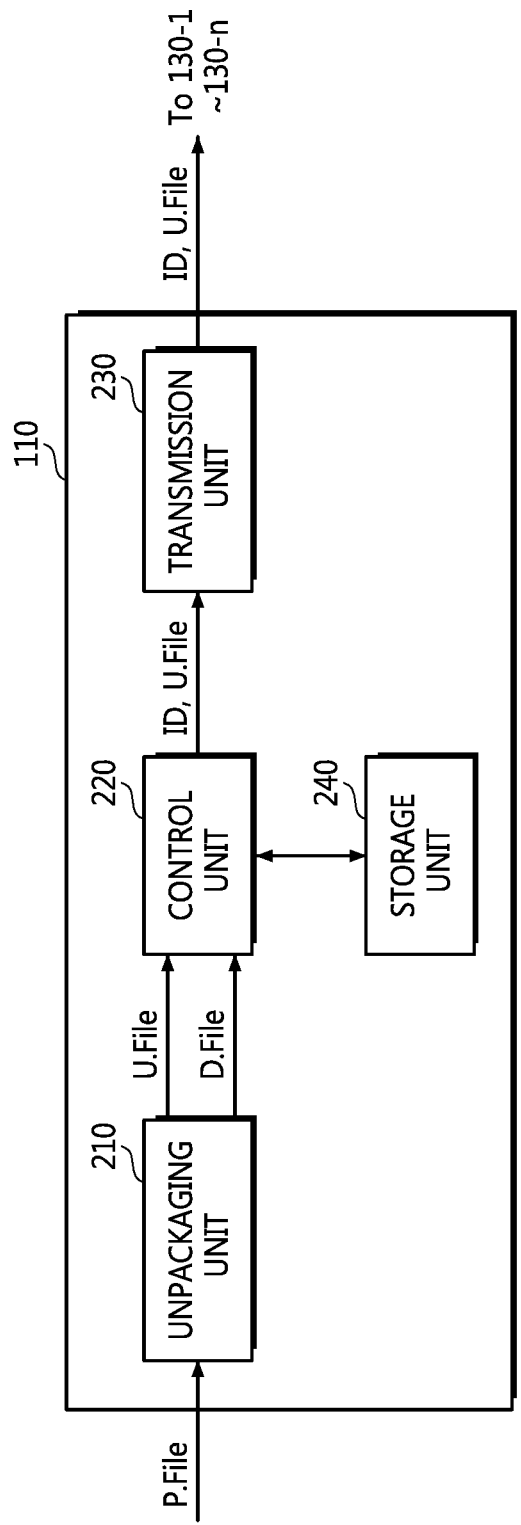
FIG. 2 is a configuration diagram of a data management device according to an embodiment of the inventive concept.

FIG. 2 is a configuration diagram of the data management device 110 according to an embodiment of the inventive concept.

Referring to FIGS. 1 and 2, the data management device 110 may include an unpackaging unit 210, a control unit 220, a transmission unit 230, and a storage unit 240.

First, when a package file P.File designated by a user is input, the unpackaging unit 210 may unpackage the input package file P.File. The package file P.File may be a file in which a latest version of a firmware file designated by a user and firmware files of devices (e.g., the plurality of BIUs 130-1 to 130-n, the ROUs 140-1 to 140-m, the RDUs 150-1 to 150-t, etc.) included in the distributed antenna system 100 are packaged together. In addition, each of the firmware files may include version information of corresponding firmware. The unpackaging unit 210 may output a first firmware file D.File including a firmware file of each of, for example, the plurality of devices 130-1 to 130-n, 140-1 to 140-m, and 150-1 to 150-t constituting the distributed antenna system 100 included in the package file P.File and a second firmware file U.File including the latest version of the firmware file designated by a user, by unpackaging the package file P.File. Here, firmware version information of the package file P.File may be the same as firmware version information of the second firmware file U.File.

When the first firmware file D.File and the second firmware file U.File are input from the unpackaging unit 210, the control unit 220 may compare the firmware version information of the second firmware file U.File with firmware version information of each of a plurality of devices included in the first firmware file D.File. As a result of the comparison, the controller 220 may determine that a device having a version lower than a version of the second firmware file U.File is a device to be updated. The control unit 220 may output information ID about the device to be updated and the second firmware file U.File according to a result of the determination.

When the information ID about the device to be updated and the second firmware file U.File are input from the control unit 220, the transmission unit 230 may transmit the second firmware file U.File to a top node (e.g., the first BIU 130-1) of the device to be updated. Furthermore, the transmission unit 230 may first transmit the information ID about the device to be updated together with the second firmware file U.File to the top node (e.g., the first BIU 130-1) of the device to be updated. For example, when the first ROU 140-1 connected to the first BIU 130-1 is the device to be updated, the transmission unit 230 may transmit the information ID about the device to be updated (e.g., information about the first ROU 140-1) together with the second firmware file U.File to the first BIU 130-1, which is an upper node of the first ROU 140-1. Thereafter, the first BIU 130-1 may transmit the second firmware file U.File to the first ROU 140-1, and the first ROU 140-1 may update firmware using the received second firmware file U.File. This firmware update process will be described in more detail with reference to FIG. 3.

In the specification, the 'upper node' may refer to a node (or unit) connected relatively adjacent to the data management device 110 or the base station 160 in the distributed antenna system 100, and the 'top node' may refer to a node (or unit) that is connected closest to the data management device 110 or the base station 160 in the distributed antenna system 100.

In the specification, a 'lower node' may refer to a node on the opposite side of the 'upper node', and a 'bottom node' may refer to a node on the opposite side of the 'top node'.

When firmware of each device to be updated is updated, the storage unit 240 may receive a result of the update from the control unit 220 and store the update result. The update result may include a firmware file name, a firmware file version, identification information of the device to be updated, an update time, and information on whether update is successful. For example, when the first BIU 130-1 is the device to be updated, the first BIU 130-1 may transmit information on whether firmware update is successful to the control unit 220 through the transmission unit 230 after firmware is updated. Then, the control unit 220 may output the update result including identification information of the device to be updated (e.g., identification information of the first BIU 130-1), a firmware file version (e.g., v8.02), information on whether update is successful, a firmware file name, and an update time.

Figure 3:
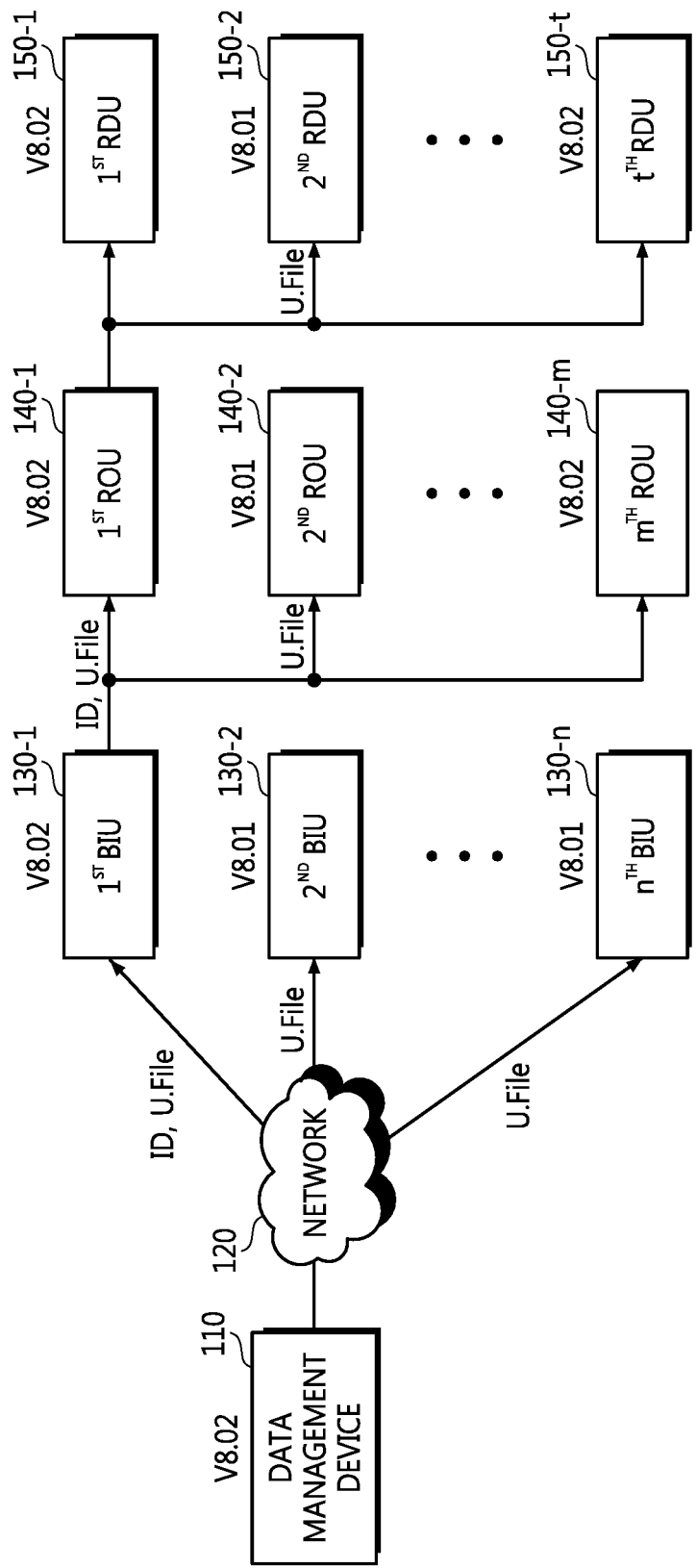
FIG. 3 is an exemplary view of a firmware update procedure of a distributed antenna system, according to an embodiment of the inventive concept.

FIG. 3 is an exemplary view of a firmware update procedure of the distributed antenna system 100, according to an embodiment of the inventive concept.

The update procedure to be described later below may be performed by each of the devices of the distributed antenna system 100 described with reference to FIGS. 1 and 2 and detailed components included in the data management device 110. However, the update procedure will be collectively referred to as being performed in each of the devices of the distributed antenna system 100 and the data management device 110 for convenience of understanding and explanation.

Referring to FIGS. 1 to 3, when the package file P. File is input by a user, the data management device 110 may unpackage the package file P.File and retain information on a latest version of firmware file (e.g., v8.02) based on the second firmware file U.File included in the package file. Thereafter, the device to be updated may be determined by comparing a version of the second firmware file U.File with a firmware file version of each of the devices constituting the distributed antenna system 100 included in the first firmware file D.File. That is, the data management device 110 may determine a device (e.g., the second BIU 130-2, the $n^{th}$ BIU 130-n, the second ROU 140-2, and the second RDU 150-2) having a firmware file version (e.g., v8.01) lower than the version of the second firmware file U.File. Then, the data management device 110 may transmit the information ID about the device to be updated together with the second firmware file U.File to the top node connected to the device to be updated. That is, as shown in FIG. 3, when the device to be updated is determined to be the second ROU 140-2, the second RDU 150-2, the second BIU 130-2, and the $n^{th}$ BIU 130-n, the data management device 110 may transmit the second firmware file U.File to the second BIU 130-2 and the $n^{th}$ BIU 130-n, and may transmit the information ID about the device to be updated (e.g., information about the second ROU 140-2 and the second RDU 150-2) together with the second firmware file U.File to the first BIU 130-1. That is, for the overall firmware update of the distributed antenna system 100, the second firmware file U.File and the information ID about the device to be updated may be transmitted to a device that needs to transmit the second firmware file U.File to a lower node of the device.

According to an embodiment, even if there is no need to transmit the second firmware file U.File to the lower node, the second firmware file U.File and the information ID about the device to be updated may be transmitted together. Here, the information ID about the device to be updated may be used to confirm whether the device is a device to be updated before updating the device to be updated.

Thereafter, the second BIU 130-2 and the $n^{th}$ BIU 130-n may update firmware to a latest version of firmware using the second firmware file U.File, and the first BIU 130-1 may transmit the second firmware file U.File to the device to be updated connected to the lower node. That is, the first BIU 130-1 may transmit the second firmware file U.File to the second ROU 140-2, and may transmit the information ID about the device to be updated (e.g., information about the second RDU 150-2) together with the second firmware file U.File to the first ROU(140-1) which is connected to the second RDU 150-2 which is the device to be updated.

When the second firmware file U.File is input from the first BIU 130-1, the second ROU 140-2 may update firmware to a latest version of firmware using the second firmware file U.File. Also, the first ROU 140-1 may transmit the second firmware file U.File to the second RDU 150-2. When the second firmware file U.File is input from the first ROU 140-1, the second RDU 150-2 may update firmware to a latest version of firmware using the second firmware file U.File.

Although a plurality of devices are connected to the first BIU 130-1 and the first ROU 140-1 as described above, a plurality of ROUs may be connected to each of the second to $n^{th}$ BIUs 130-2 to 130-n, and a plurality of RDUs may be connected to each of the second to $n^{th}$ ROUs 140-2 to 140-n. Furthermore, it will be understood by those of ordinary skill in the art that the update method of each device is the same as the update method described above.

Figure 4:
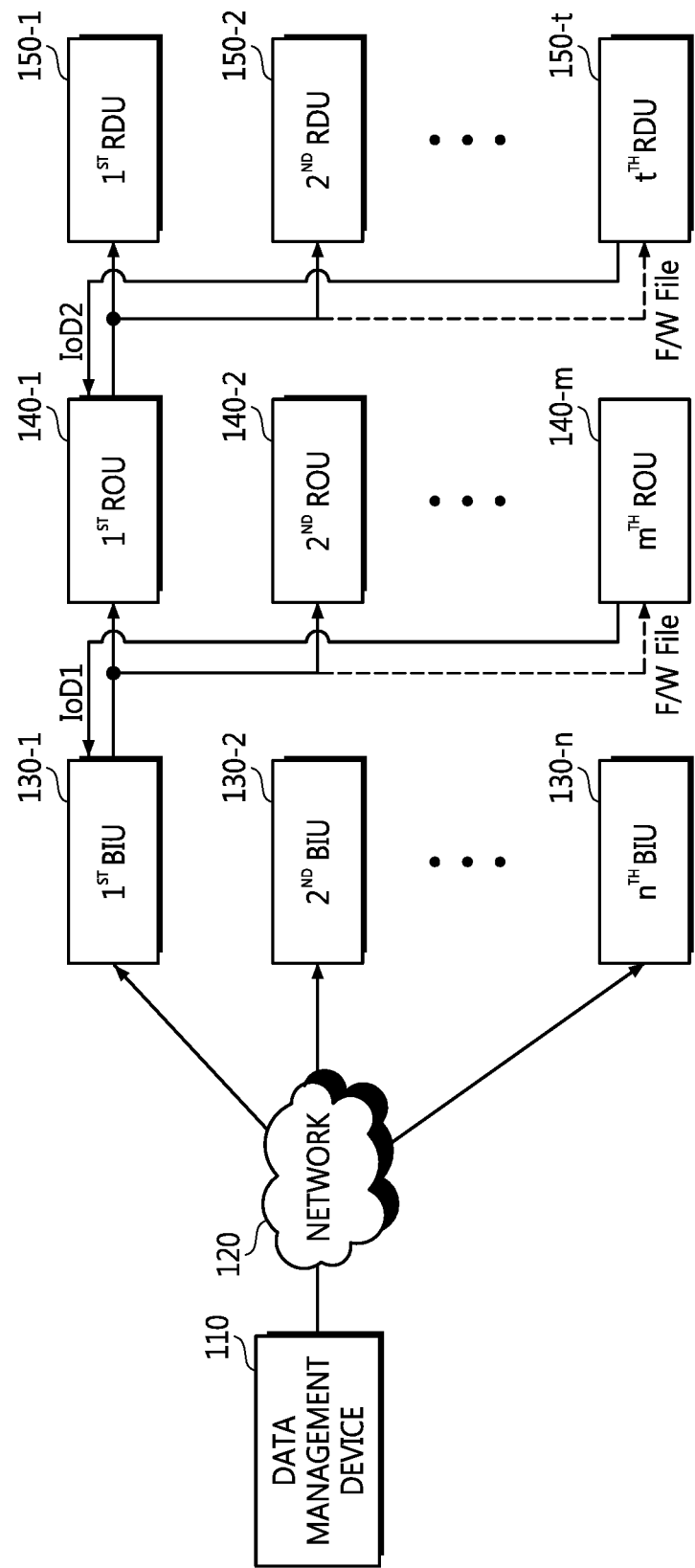
FIG. 4 is an exemplary view of a process of installing a new device in a distributed antenna system, according to an embodiment of the inventive concept.

FIG. 4 is an exemplary view of a process of installing a new device in the distributed antenna system 100, according to an embodiment of the inventive concept.

Referring to FIGS. 1 to 4, the plurality of ROUs may be connected to a lower node of each BIU (e.g., the first BIU 130-1). A user may connect a new ROU (e.g., the $m^{th}$ ROU 140-m) to the lower node of each BIU (e.g., the first BIU 130-1). Furthermore, the new ROU may also be connected to the lower nodes of the second BIU 130-2 to the $n^{th}$ BIU 130-n. Hereinafter, for convenience of understanding and explanation, the new ROU (e.g., the $m^{th}$ ROU 140-m) is connected to the lower node of the first BIU 130-1.

First, when the new ROU (e.g., the $m^{th}$ ROU 140-m) is connected to the lower node of the first BIU 130-1, the $m^{th}$ ROU 140-m may transmit first identification information IoD1 to the first BIU 130-1. The first identification information IoD1 may include an address, an ID, manufacturer information, and the like of the $m^{th}$ ROU. When the first identification information IoD1 is input from the $m^{th}$ ROU 140-m, the first BIU 130-1 may compare the first identification information IoD1 with identification information of existing ROUs (e.g., the first ROU 140-1) that are retained in the first BIU 130-1 and determine a type of the $m^{th}$ ROU 140-m connected to the first BIU 130-1. The type of the $m^{th}$ ROU 140-m may be determined using the manufacturer information and ID of the $m^{th}$ ROU 140-m. As a result of the determination of the type of the $m^{th}$ ROU 140-m, the first BIU 130-1 may transmit a latest firmware file F/W File corresponding to the type of the $m^{th}$ ROU 140-m to the address of the $m^{th}$ ROU 140-m. When the latest firmware file F/W File is input, the $m^{th}$ ROU 140-m may update firmware to a latest version of firmware using the latest firmware file F/W File.

A plurality of RDUs may be connected to a lower node of each ROU (e.g., the first ROU 140-1). A user may connect a new RDU (e.g., the $k^{th}$ RDU 150-t) to the lower node of each ROU (e.g., the first ROU 140-1). The new RDU may also be connected to the lower nodes of the second ROU 140-2 to the $m^{th}$ ROU 140-m. Hereinafter, for convenience of understanding and explanation, the new RDU (e.g., the $k^{th}$ RDU 150-t) is connected to the lower node of the first ROU 140-1.

First, when the new RDU (e.g., the $k^{th}$ RDU 150-t) is connected to the lower node of the first ROU 140-1, the $k^{th}$ RDU 150-t may transmit second identification information IoD2 to the first ROU. The second identification information IoD2 may include an address, an ID, manufacturer information, and the like of the $k^{th}$ RDU. When the second identification information IoD2 is input from the $k^{th}$ RDU 150-t, the first ROU 140-1 may compare the second identification information IoD2 with identification information of existing RDUs (e.g., the first RDU 150-1) that are retained in the first ROU 140-1 and determine a type of the $k^{th}$ RDU 150-t connected to the first ROU 140-1. Here, the type of the $k^{th}$ RDU 150-t may be determined using the manufacturer information and ID of the $k^{th}$ RDU 150-t. As a result of the determination of the type of the $k^{th}$ RDU 150-t, the first ROU 140-1 may transmit a latest firmware file F/W File corresponding to the type of the $k^{th}$ RDU 150-t to an address of the $k^{th}$ RDU 150-t. When the latest firmware file F/W File is input, the $k^{th}$ RDU 150-t may update the firmware to a latest version of firmware using the latest firmware file F/W File.

FIG. 5 is a flowchart of an operation of a data management device 110 according to an embodiment of the inventive concept.

A method of managing data of the data management device 110 according to an embodiment will be described in detail later below with reference to FIG. 5.

Referring to FIGS. 1 to 5, in operation S510, when the package file P.File is input by a user, the data management device 110 may obtain the first firmware file D.file and the second firmware file U.File by unpackaging the input package file P.File. The first firmware file D.File may include a firmware file for each of the devices constituting the distributed antenna system 100. The second firmware file U.File may include a latest version of a firmware file designated by a user. Firmware version information of the package file P.File may be the same as firmware version information of the second firmware file U.File.

In operation S520, the data management device 110 may compare version information of the packagne file P. File (i.e., version information of the second firmware file U.File) with firmware file version information of each of the devices constituting the distributed antenna system 100 included in the first firmware file D.File. That is, if there are a total of 30 devices connected to the distributed antenna system 100, the data management device 110 may compare the version information of the second firmware file U.File with 30 firmware file version information included in the first firmware file D.File.

In operation S530, the data management device 110 may determine devices that require update according to a result of the comparison in operation S520. For example, if versions of firmware files of 10 devices from among 30 devices connected to the distributed antenna system 100 are lower than that of the second firmware file U.File, the data management device 110 may determine whether the corresponding 10 devices are devices that require update.

Thereafter, in operation S540, the data management device 110 may transmit the second firmware file U.File such that a device that requires update of a firmware file is updated, and may transmit information ID about the device that requires update to the top node connected to the data management device 110. For example, when a firmware file of the second ROU 140-2 requires update, the data management device 110 may transmit information ID about the second ROU 140-2 together with the second firmware file U.File to the first BIU 130-1.

A data management device of a distributed antenna system according to an embodiment of the inventive concept may more efficiently update firmware of devices constituting the distributed antenna system, thereby reducing cost and time required for firmware update.

In addition, the data management device of the distributed antenna system according to an embodiment of the inventive concept may collectively update firmware of all devices included in the distributed antenna system without a missing device.

While one or more embodiments have been described with reference to the figures, it will be understood by those of ordinary skill in the art that various changes in form and details may be made therein without departing from the spirit and scope of the disclosure as defined by the following claims.

What is claimed is:

1. A data management device of a distributed antenna system, the data management device comprising:
a processor configured to receive a package file including firmware files which are currently and respectively installed in a plurality of devices constituting the distributed antenna system, unpackage the package file, and determine a target device requiring firmware update by comparing version information of the package file with version information of each of the firmware files included in the unpackaged package file; and
a transmitter configured to transmit a latest version of a firmware file to a top node device corresponding to a top node of the target device according to a result of the determination of the processor,
wherein the package file comprises the latest version of the firmware file, the firmware files, and the version information of each of the firmware files,
wherein the version information of the package file is identical to version information of the latest version of the firmware file, and
wherein the transmitter is configured to transmit the latest version of the firmware file along with information of the target device to the top node device so that the latest version of the firmware file is forwarded to the target device by other devices in sequence.

2. The data management device of claim 1, wherein the processor is configured to determine that a device having a firmware version lower than a version of the package file is the target device requiring firmware update.

3. The data management device of claim 1, wherein the plurality of devices comprise at least one of a Base Transceiver Station (BTS), Interface Unit (BIU), a Main Drive BTS Unit (MDBU), a Remote Optical Unit (ROU), and a Remote Digital Unit (RDU).

4. The data management device of claim 3, wherein the BIU is configured to retain identification information of an existing ROU connected to a lower node of the BIU and transmit a latest firmware file to a new ROU when the new ROU is connected to the lower node of the BIU.

5. The data management device of claim 4, wherein the new ROU is configured to transmit identification information of the new ROU to the BIU when the new ROU is connected to the BIU, wherein
the identification information of the new ROU includes an address, an ID, and manufacturer information of the new ROU.

6. The data management device of claim 5, wherein the BIU is configured to, when the identification information of the new ROU is input from the new ROU, compare the retained identification information with the input identification information to determine a type of the new ROU connected to the BIU, and transmit the latest firmware file corresponding to the determined type of the new ROU to the address of the new ROU.

7. The data management device of claim 3, wherein the ROU is configured to retain identification information of an existing RDU connected to a lower node of the ROU and transmit a latest firmware file to a new RDU when the new RDU is connected to the lower node of the ROU.

8. The data management device of claim 7, wherein the new RDU is configured to transmit identification information of the new RDU to the ROU when the new RDU is connected to the ROU, wherein
the identification information of the new RDU includes an address, an ID, and manufacturer information of the new RDU.

9. The data management device of claim 8, wherein
the ROU, when the identification information of the new RDU is input from the new RDU, is configured to compare the retained identification information with the input identification information to determine a type of the new RDU connected to the ROU, and transmit the latest firmware file corresponding to the determined type of the new RDU to the address of the new RDU.

10. The data management device of claim 1, further comprising:
a memory configured to store a result of the update by the latest version of the firmware file received from the processor after the latest version of the firmware file is transmitted to the target device requiring the firmware update.

11. The data management device of claim 10, wherein
the processor is configured to transmit the update result including at least one of identification information of the target device, a firmware file name, firmware file version information, an update time, and information that is received from the target device and indicates whether update is successful.

12. A method of managing data of a distributed antenna system, the method comprising:
receiving a package file including firmware files which are currently and respectively installed in a plurality of devices constituting the distributed antenna system;
unpackaging the package file;
comparing version information of the package file with version information of each of the firmware files included in the unpackaged package file;
determining a target device requiring firmware update according to a result of the comparing; and
transmitting a latest version of a firmware file to a top node device corresponding to a top node of the target device, according to a result of the determining,
wherein the package file comprises the latest version of the firmware file, the firmware files, and the version information of each of the firmware files,
wherein the version information of the package file is identical to version information of the latest version of the firmware file, and
wherein the transmitting comprises transmitting the latest version of the firmware file along with information of the target device to the top node device so that the latest version of the firmware file is forwarded to the target device by other devices in sequence.

13. The method of claim 12, wherein
the determining of the target device requiring firmware update comprises determining that a device having a firmware version lower than a version of the package file is the target device requiring firmware update.

* * * * *